April 23, 1929. S. EBERLY 1,709,845
TRUCK MOUNTING
Filed Feb. 3, 1927
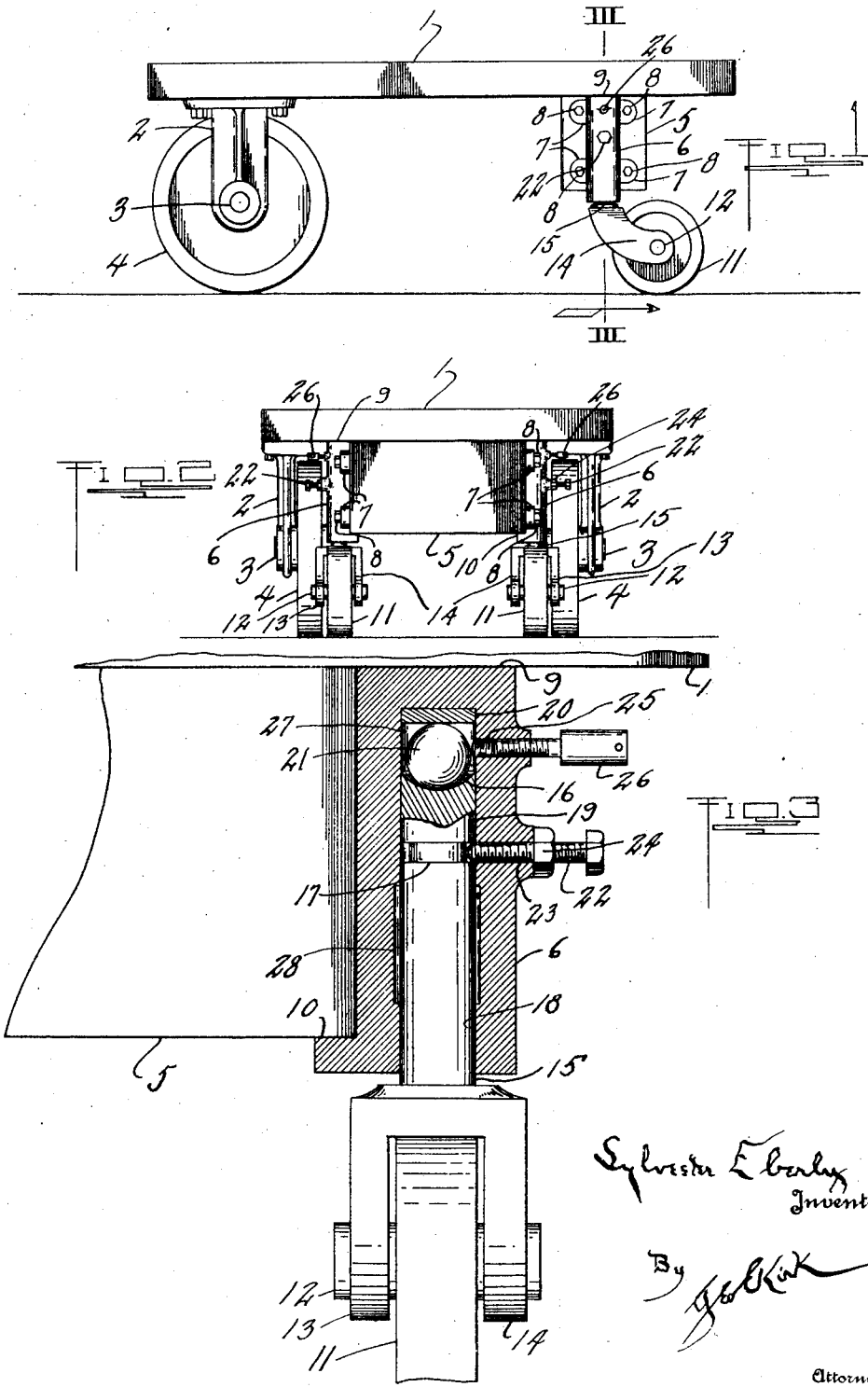

Patented Apr. 23, 1929.

1,709,845

UNITED STATES PATENT OFFICE.

SYLVESTER EBERLY, OF TOLEDO, OHIO, ASSIGNOR OF ONE-THIRD TO GEORGE E. KINNEY, ONE-THIRD TO KNUD FLENSTED, AND ONE-THIRD TO EDGAR M. JAMISON, ALL OF TOLEDO, OHIO.

TRUCK MOUNTING.

Application filed February 3, 1927. Serial No. 165,614.

This invention relates to swingable bearing devices, especially as carrying vertical load and subjected to lateral thrusting action.

This invention has utility when incorporated in swingable stem-carrying wheels or rollers having a bearing and lubrication therefor housed against attack from factory dust, steam washing, etc.

Referring to the drawings:

Fig. 1 is a side elevation of a truck such as used in warehouses, factories, dairies, etc.;

Fig. 2 is an end elevation from the front of the truck of Fig. 1; and

Fig. 3 is a section on the line III—III, Fig. 1, looking in the direction of the arrow.

Truck platform 1 is shown as having in the rear two pairs of brackets 2 carrying rear axle 3. Between each pair of brackets is mounted truck wheel 4. Forwardly of the vehicle, under the truck platform 1, is disposed cross sill 5 terminally carrying socket members 6 having ears 7 assembled with the sill 5 by bolts 8. This member 6 may have upper terminus 9 abutting the underside of the platform 1 and also have ledge 10 for riding under sill 5 in a substantial truck assembly for carrying considerable loads.

Roller 11 is shown as mounted on pin 12 as a bearing shaft extending between arms 13, 14, as a fork from which upwardly extends stem 15. This stem 15 terminates in seat 16. Spaced from this seat terminus 16 of the stem 15 is annular groove 17 about this stem 15. This socket member 6 has socket in which stem 15 extends to have lateral bearing portions 18, 19. This socket member, terminally of this vertical recess of the socket, is provided with hardened bearing plate 20 as a thrust bearing with which coacts thrust ball 21 as seating in terminal bearing seat 16 of the stem 15. This swivel mounting for the roller 11 is retained in assembly with the truck 1 by pin or bolt 22 through opening 23 in the socket member 6. This bolt 22, as adjusted in register with the groove 17, may be run into seating position and then backed off a one-half turn to be locked by lock nut 24. This permits lifting of the truck without having the stem 15 slip out. This truck may be readily swung or turned about in a short radius with the gravity load from the truck cared for in the region of the thrust ball 21. Lateral bearing as brought into play in shifting the truck from place to place, is taken care of in the bearing regions 18, 19, of the socket member. These bearings are protected and concealed from grit or abrasive materials as well as undesirable dust and dirt and may not be corroded by steam or fume action or water to which the truck might be more or less subjected in industrial operations. Furthermore, there is provided herein adequate means for maintained lubrication thus insuring ready operation of the truck at all times with a minimum of upkeep expense, together with much prolonged life of the truck therefrom. To this end additional opening 25 is provided in the socket member 6, preferably in the region of the thrust ball 21. Lubricant supply means, as pressure lubrication fitting 26, may be mounted at this opening 25 so that more or less hard oil may be introduced into terminal chamber 27 about the thrust ball 21 to work therefrom into lubricant reserve chamber 28 as an enlargement of the socket in the region of the bearing 18, 19. This mode of supply of grease not only may be adopted for effective lubrication of this swivel mounting for the truck, but has a cleanliness against exposure of a lubricant, as might, in certain uses of the truck, smear or act deleteriously as to the materials handled.

What is claimed and it is desired to secure by Letters Patent is:

A caster embodying an open bottom cylinder provided with an upper closed end and laterally extending ears, anchoring means for the caster engaging said ears in locating the cylinder for an exposed region therealong, a thrust bearing ball in the upper portion of the cylinder for contacting said closed end, a roller, a forked stem mounting the roller, said stem extending upwardly into the cylinder and engaging the thrust ball, said stem having a groove, means through the cylinder for engaging the groove to retain the stem and cylinder assembled to hold the ball in thrust bearing position, said cylinder having clearance from the stem intermediate the extent of the cylinder in thereby providing spaced lateral bearings for the stem, and a normally closed port through the cylinder in the vicinity of the ball cooperating for a lubricant supply to be distributed to the clearance, with said port and clearance coacting as lubricant supply chambers for the ball and the two lateral bearings for the stem.

In witness whereof I affix my signature.

SYLVESTER EBERLY.